310-369 SR

XR 3,676,722

United States Patent [15] 3,676,722
Schafft [45] July 11, 1972

[54] STRUCTURE FOR BIMORPH OR MONOMORPH BENDERS

[72] Inventor: Hugo W. Schafft, Des Plaines, Ill.

[73] Assignee: Motorola, Inc., Franklin Park, Ill.

[22] Filed: April 15, 1971

[21] Appl. No.: 134,279

Related U.S. Application Data

[63] Continuation-in-part of Ser. No. 863,836, Oct. 6, 1969, abandoned.

[52] U.S. Cl.........310/8.6, 310/8.3;9.1;9.6;9.7, 179/100.41 P
[51] Int. Cl...........H04r 17/00
[58] Field of Search..........179/110.1 R, 100.41 R, 100.41 B, 179/100.41 P, 110.1 B; 310/8, 8.2–8.8, 9.1–9.8

[56] References Cited

UNITED STATES PATENTS

| | | | |
|---|---|---|---|
| 2,640,889 | 6/1953 | Cherry, Jr. | 310/9.6 X |
| 2,900,536 | 8/1959 | Palo | 310/9.6 |
| 2,323,030 | 6/1943 | Gruetzmacher | 310/9.6 X |
| 1,803,274 | 4/1931 | Sawyer | 179/110.1 B X |
| 3,360,770 | 12/1967 | Friedman | 310/8.6 X |
| 3,588,381 | 6/1971 | Schafft | 310/8.6 X |

*Primary Examiner*—J. D. Miller
*Assistant Examiner*—Mark O. Budd
*Attorney*—Mueller & Aichele

[57] ABSTRACT

Bimorph benders comprised of a pair of piezoelectric wafers with a center vane of conductive material disposed therebetween or monomorph benders comprised of one piezoelectric wafer and one wafer of piezoelectrically inactive material with a center vane of conductive material disposed therebetween have one portion rigidly held in place and another portion coupled to move or be moved by a mechanical load thereby applying a distribution of bending forces to the bender. By selectively constructing the center vane so that the stiffness of the assembly varies in proportion to the magnitude of the bending force applied to the bender and by bending the wafers to conform to the shape of the center vane, increased coefficient of electromechanical coupling, strength, high frequency response, and linearity result.

14 Claims, 6 Drawing Figures

Inventor
HUGO W. SCHAFFT
BY
Mueller & Aichele
ATTYS.

STRUCTURE FOR BIMORPH OR MONOMORPH BENDERS

CROSS REFERENCE TO RELATED APPLICATION

This application is a continuation-in-part of application Ser. No. 863,836 filed Oct. 6, 1969, now abandoned.

BACKGROUND OF THE INVENTION

Transducers for converting electrical energy into mechanical energy and vice versa are frequently employed in modern electromechanical apparatus. The coefficient of electromechanical coupling $K$, is defined by the following ratios:

$$K=\sqrt{\frac{\text{input electrical energy converted into output mechanical energy}}{\text{input electrical energy}}}$$

or $$K=\sqrt{\frac{\text{input mechanical energy converted into output electrical energy}}{\text{input mechanical energy}}}$$

A bimorph of monomorph bender is one type of transducer which utilizes the piezoelectric properties of some materials to for instance, either convert the mechanical vibrations of a phonograph needle into an electrical signal or to convert the amplified electrical signal back into mechanical vibrations which moves the cone of a loudspeaker thus producing sound. Benders generally have lighter weight, take up less space, and have greater efficiency of $K$ than prior art electro-magnetic transducers which include coils with windings having resistance loss and with cores having eddy current and hysteresis losses.

A bimorph bender may include two thin wafers of piezoelectric material which are electrically polarized in opposite directions and which have conductive terminals affixed on each side thereof. A monomorph bender may include one piezoelectric wafer which is electrically polarized in a given direction with conductive terminals affixed on each side thereof and one wafer of piezoelectrically inactive material. In either case a thin, pliable center vane of conductive material is sandwiched between the wafers for conducting electrical potentials to the piezoelectric wafer or wafers and for adding structural strength to the composite structure. In the past, this center vane has usually been constructed to have a constant stiffness or a constant resistance to bending forces applied along its length by the mechanical load, the supporting structure connected to the bender, and the mass of the bender itself.

In operation of the bimorph, for example, as an electrical potential of a given polarity is applied through the conductive center vane to the inside surfaces of the wafers and through the conductive terminals to the outside surfaces of the wafers, one of the oppositely poled wafers tend to expand along the longitudinal axis of the bimorph while the other wafer simultaneously tends to contract along the same axis thereby producing a bending of the structure in one direction along its transverse axis. After this potential is removed a prior art bimorph, having a center vane of uniform stiffness, remains partially bent or, in other words, it does not return to where its new longitudinal axis superimposes its former longitudinal axis. As an electrical potential of the opposite polarity is applied, the bimorph bends in the other direction along the transverse axis; and, similarly, as this potential is removed the bimorph again does not return to its former position. This tendency of the prior art bimorph to not return to its initial position, which is called mechanical hysteresis creates non-linearity between the amount of excursion of the mechanical load and the amplitude of the electrical signal. In the prior art, this mechanical hysteresis was reduced by precompressing the ceramic material comprising the wafers. This was accomplished by cementing a metal center vane, at an elevated temperature, between the ceramic sheets and then allowing the composite structure to cure. As the metal center vane cooled, it tended to contract thereby precompressing the ceramic.

Further problems with benders having center vanes of uniform stiffness are illustrated by the following application wherein the circumference of a bimorph comprised of flat circular wafers and a center vane of uniform stiffness is rigidly held in place, and the center portion of one of the wafers thereof is affixed to the cone of a loudspeaker. The whole bimorph-cone assembly will have one natural resonant frequency, $w_o$ which is called the system resonant frequency. The driver of bimorph will respond to all frequencies that are less than $w_o$. As the driving frequency coincides with $w_o$ maximum excursions of the cone will be produced. As the driving frequency is further increased, the driver or bimorph will no longer move as a whole and parts thereof will break into overtone resonances or anti-resonances. At this upper cutoff frequency, $w_h$ the bimorph assembly will not effectively produce excursions in the cone. Furthermore, since the wafers of the bimorph must be thin for effective operation, prior art bimorphs having uniform stiffness and strength will tend to fracture where the stress is most severe.

SUMMARY OF THE INVENTION

It is, accordingly, an object of the invention to provide improved bimorph and monomorph benders having less mechanical hysteresis and greater high frequency response than prior art benders.

Another object of this invention is to provide a bimorph and monomorph bender construction which has increased mechanical strength and an increased coefficient of electromechanical coupling, $K$.

In brief, a preferred embodiment of the invention primarily consists of selectively constructing the center vane of a piezoelectric bender such that the stiffness of the bender is proportional to the magnitude of the shearing or bending force applied to it and selectively precompressing and shaping the wafers to conform to the vane. In one application, for example, a bimorph is comprised of two circular ceramic wafers having a conductive center vane disposed therebetween. The circumferences of the wafers are rigidly fastened to a mechanical supporting member which restricts their movement and the center portion of one of the wafers is coupled to a mechanical load. As a result of the loading and the mass of the wafers, the amplitude of the dynamic bending force is least at the center portion and continuously increases toward the circumferential edge of the transducer. Because the mass of the circular wafers continuously increases from the center portion toward the circumference the stiffness of the bender tends to increase at a higher rate than the magnitude of the bending force. In one embodiment of the invention the stiffness of the center vane is selectively adjusted to compensate for the undesirably large increase in stiffness inherent in the circular structure of the wafers. More specifically, the center vane is constructed to have its greatest stiffness at the center of the bimorph and its stiffness continuously decreases to where it is least stiff at the circumference of the bimorph. The stiffness characteristic of the center vane may be varied by adjusting its lateral dimension or thickness. As a result, the composite stiffness of the bimorph is proportional to the magnitude of the bending forces at each incremental area thereof. The wafers are tensiley stressed by bending them into a bowl or dish shape so that they can enclose the center vane. This structure has greater strength, less mechanical hysteresis, greater high frequency response, and a large value of $K$ than prior art structures having flat wafers and a center vane of uniform stiffness.

DESCRIPTION OF THE PREFERRED EMBODIMENT

The preferred embodiment of the invention includes structuring the center vane of a bimorph or monomorph bender so that the stiffness, strength, or resistance to bending of the bender is proportional to the magnitude of the bending forces applied thereto.

Figure 1:
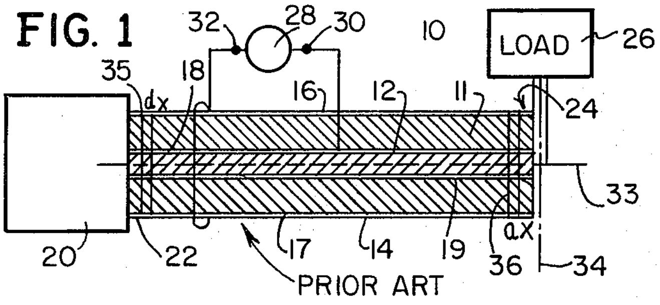
FIG. 1 is a cross-sectional view of a prior art bimorph bender.

The prior art bimorph bender 10 of FIG. 1 is comprised of a thin sheet or wafer 11 of ceramic material which has been poled or electrically polarized in a given direction; an electrically conductive center vane 12, which could be made of conductive epoxy, for instance; and, another thin sheet or wafer 14 of ceramic material which has been poled in a direction opposite to that of wafer 11. Electrical terminals or conductive surfaces 16 and 17 are respectively affixed to the outside surfaces of wafers 11 and 14. Conductive surfaces 18 and 19 are respectively affixed to the inside surfaces of wafers 11 and 14 thereby making electrical contact with each other through conductive center vane 12. Mass 20, which might be, for example, the frame of a loudspeaker, rigidly holds end 22 of bimorph 10 so that it cannot move; and end 24 of bimorph 10 is coupled to a mechanical load 26 which might be, for example, the cone of the loudspeaker.

Electrical signal supply 28 has one output terminal 30 connected to center vane 12, and another output terminal 32 connected to both conductive surfaces 16 and 17 of the wafers. A DC voltage of one polarity applied to the outside surfaces of wafers 11 and 14 produces an electric field across the wafers. Since the wafers are oppositely poled, the length of one of them as measured along longitudinal axis 33 tends to decrease while the length of the other as measured along axis 33 tends to increase thus resulting in a bending motion which moves end 24 of bimorph 10 in a direction along transverse axis 34 toward the wafer whose length is decreased thus moving load 26 in that direction.

After the DC voltage is removed from terminals 30 and 32, bimorph 11 tends to reorient itself in the position it was in immediately prior to the application of the DC voltage; however, because the material of the bimorph is not perfectly resilient, the bimorph does not return to its exact initial position but remains slightly bent thereby exhibiting mechanical hysteresis. If a DC voltage of the opposite polarity to that previously discussed is impressed by voltage source 28 across wafers 11 and 14, then the bimorph bender bends or deflects so that end 24 moves in the opposite direction along transverse axis 34. After this voltage is removed the bimorph similarly does not return to the exact position it was in immediately before the second potential was applied. If voltage source 28 provides an alternating voltage across the terminals 30 and 32, end 24 of bimorph bender 11 oscillates at a frequency equal thereto, provided the frequency does not exceed the maximum cutoff frequency of the bender, thus oscillating load 26 which, for instance, could create sound waves in a known manner, drive the pen of an electrical recorder, etc.

The prior art assembly comprised of bimorph 10 and load 26 will have a system resonant frequency of $w_o$. Bimorph 10 will respond to all frequencies provided by source 28 that are less than $w_o$ by moving as a whole and producing excursions in load 26. As the frequency of the driving signal from source 28 coincides with $w_o$ maximum excursion of load 26 will result. If the frequency of the driving signal is increased further to exceed the upper cutoff frequency $w_h$, bimorph 10 will no longer move as a whole but different parts thereof will begin moving at different tone resonances and anti-resonances and the amount of excursion of load 26 will become a non-linear function of the driving signal.

In the prior art bimorph of FIG. 1 a portion 35 of length $dx$, located immediately adjacent mass 20, is subjected to a bending force $F_1$ caused by the loading of both the remainder of the mass of the bimorph bender and the mechanical load 26. Conversely, a portion 36 of bimorph 10 likewise having a length $dx$ immediately adjacent load 26 is subjected to a bending force $F_2$ caused by only load 26. As illustrated by solid graph 38 of FIG. 2, the magnitude of the bending force applied at points along the cross-section of the bimorph bender is, therefore, maximum at mounted end 22 and continuously decreases to a minimum at loaded end 24. Inasmuch as the center vane 12 is made of a homogeneous material having a constant cross-sectional area, the stiffness or resistance to the bending force as a function of the longitudinal dimension of bimorph 10 is constant as shown by dotted graph 39 of FIG. 2.

Figure 2:
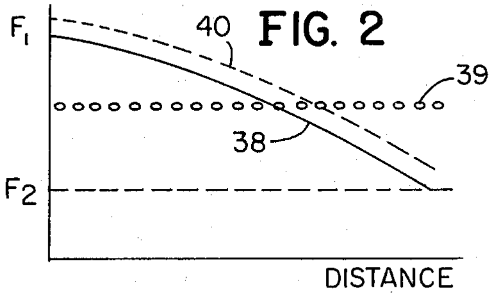
FIG. 2 is a graph which qualitatively illustrates the bending forces applied to the bimorphs of FIGS. 1 and 3 and the stiffness of the center vanes of the bimorphs of FIGS. 1 and 3 all as a function of the lengths thereof.
Figure 3:
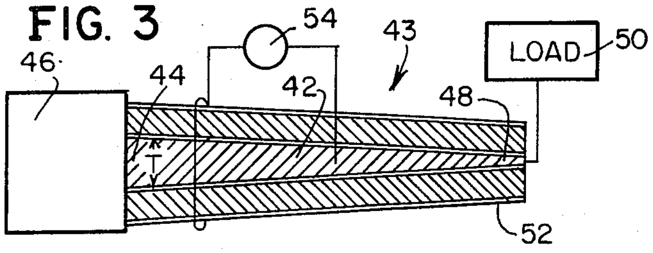
FIG. 3 is a cross-sectional view of a bimorph bender having a modified center vane.

The resistance to bending or stiffness of the center vane ought to be modified so that it is proportional to the bending force as shown by the dashed curve 40 of FIG. 2. There are many ways in which the stiffness of the center vane can be varied so that it has this desired characteristic. One way is illustrated in FIG. 3 where the thickness T of center vane 42, and thus the stiffness thereof, varies along the the length of bimorph 43 in the same manner as the bending force varies as illustrated by curve 38 of FIG. 2. In particular, end 44 of center vane 42, adjacent mass 46, is constructed to be thicker than end 22 of center vane 12 adjacent mass 20 because the force $F_1$ is greatest at this point. Also, end 48 of center vane 42 adjacent load 50, is constructed to be thinner than end 24 of center vane 12 adjacent load 26 because the force $F_2$ is least at this point.

Bimorph 43 of FIG. 3 is mechanically stronger than prior art bimorph 10 os FIG. 1, because the structure of center vane 42 provides the greatest amount of strength where the greatest amount of loading occurs i.e., at end 44 which is affixed to mass 46. Moreover, the structure of FIG. 3, wherein center vane 42 has a given volume, has a higher system resonant frequency $w_o$ and a higher upper cutoff frequency $w_h$ than a structure as shown in FIG. 1 but wherein center vane 12 also has the given volume. This is because the stiffness of center vane 42 is proportional to the bending force produced by load 50 and the mass of the bimorph itself.

Either wafer 11 or wafer 14 of bimorph 10 could be replaced by a wafer of nonpiezoelectric material to create a monomorph bender. The center vane of this monomorph could be modified in the aforementioned manner to increase the strength and upper cutoff frequency of the monomorph. Moreover, the nonpiezoelectric wafer could be combined with center vane 42 to form one, integral member thereby resulting in a monomorph comprised of a total of only two elements.

Figure 4:
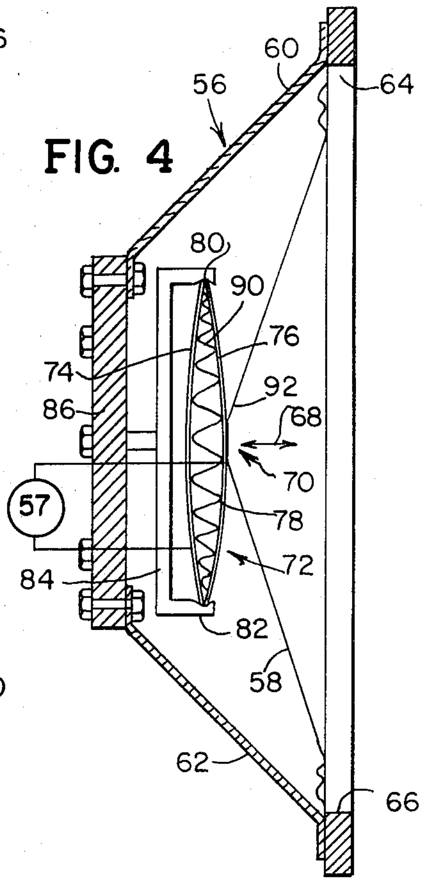
FIG. 4 is a cross-sectional view of a speaker which includes another bimorph bender having a center vane which has been selectively modified in accordance with the invention.
Figures 5, 6:
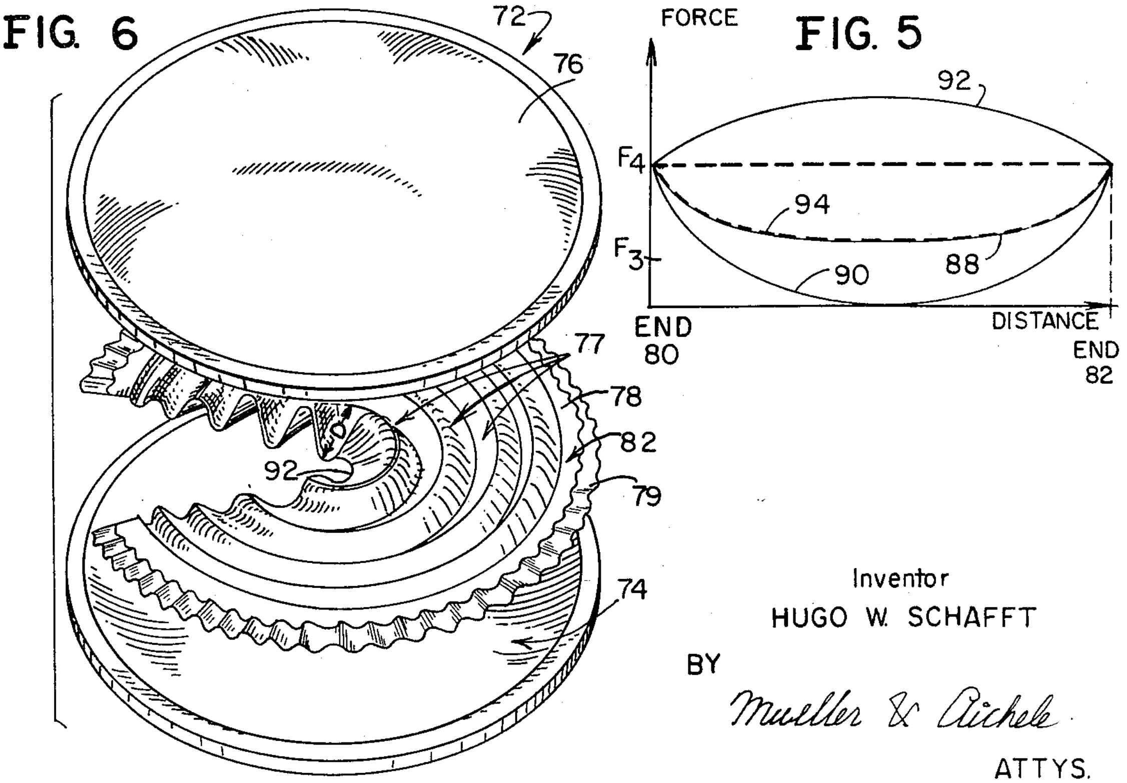
FIG. 5 is a graph illustrating both the bending force applied to the bimorph shown in FIGS. 4 and 6 and the composite stiffness of the bimorph shown in FIGS. 4 and 6 along a diameter thereof.
FIG. 6 is an exploded, perspective view of the improved bimorph bender included in the speaker of FIG. 4.

FIG. 4 shows a loudspeaker assembly 56 for changing audio frequency alternating current signals from source 57, which might be the power amplifier stage of either a phonograph or a radio, into sound. This speaker includes cone 58 which is mechanically supported at its periphery by frame members 60 and 62 so that it can move back and forth along the axis indicated by arrows 68 thus producing compression sound waves in the surrounding air. Apex 70 of cone 58 is affixed to the center portion of bimorph 72, which is also shown in FIG. 6 in an exploded view. Bimorph 72 is comprised of concave or dish shaped circular ceramic wafers 74 and 76, each of which have conductive terminals affixed to both sides thereof. These wafers are mechancially separated and electrically connected by corrugated, conductive center vane 78 which is disposed therebetween and cemented thereto. The corrugation or raised portions 77 on center vane 78, which can be in the form of a spiral or a plurality of concentric circles, acts as a hinge thereby allowing the center portions of the wafers to move with respect to each other in response to the electrical signal from source 57. Radial corrugations 79, which are at substantially right angles with corrugations 77, keep the circumferential edges of the wafers from moving relative to each other thus preventing loss of bending excursion in the wafers. Ends 80 and 82 of bimorph 72 are rigidly affixed to and held in place by mounting member 84 which is connected to mass 86.

Curve 88 of FIG. 5 qualitatively shows the variation in amplitude of the dynamic bending forces applied to bimorph 72 as a function of the distance along a diameter beginning at end 80 and extending to end 82 along the longitudinal axis 90 of the bimorph of FIG. 4. The magnitude of the bending force is least near the center portion of the bimorph as designated by $F_3$ on curve 88, and increases until it reaches a maximum at each end 80 and 82 as designated by $F_4$.

In accordance with the invention, therefore, the composite stiffness of the bender ought to be maximum at the points of maximum bending force i.e., at end portions 80 and 82. Because of the increase in mass of circular wafers 74 and 76 included in concentric circles of increasing diameter about the center of the bender, the stiffness naturally increases as the magnitude of the bending force increases. However, as qualitatively shown by curve 90 of FIG. 3 the increase in stiffness is greater than the increase in the magnitude of the bending forces.

Center vane 78 compensates for the too rapid increase in stiffness contributed by the circular wafers by providing a Stiffness which varies inversely with the magnitude of the bending force. As qualitatively shown by curve 92, the magnitude of the stiffness characteristic of center vane 78 is greatest at the center of the bender where the magnitude of the bending forces is least, and the magnitude of the stiffness characteristic continuously decreases to where it is least at the periphery or circumference of the bender where the magnitude of the bending force is greatest. Since the stiffness characteristic of the center vane varies in the opposite manner from the inherent stiffness of the circular wafers, the composite stiffness of the combination of the center vane and wafers can be empirically adjusted to provide a bimorph or monomorph bender with a stiffness characteristic as shown by dotted line 94 of FIG. 5, which is proportional to the magnitude of the bending forces. The stiffness characteristic of the center vane can be controlled by selectively adjusting its thickness in the lateral direction perpendicular to the major axis of the bender as shown in FIG. 6.

One embodiment of the invention as shown in FIG. 6, includes members having diameters of about 1.8 inches. The lateral dimension D of center vane 78 is about 0.024 inch at the center of the bender and the dimension continuously tapers off to where it is about 0.014 inch at the circumference thereof. It has been experimentally observed that a prior art bimorph similar to bimorph 72 but having a center vane of constant thickness has a coefficient of electro-mechanical coupling of *K* equal to 0.475 whereas a bimorph constructed to have a center vane of selected thickness as shown in FIG. 6 has a *K* equal to 0.575. The higher coefficient of coupling, *K* is achieved partly because the dish shape of ceramic wafers 74 and 76 distributes the stresses therein over a larger area than if the wafers are flat. Inasmuch as the ratio of the amount of transduced output energy to the amount of input energy is equal to the square of the coefficient of electro-mechanical coupling, a bimorPh constructed in the manner of the invention delivers about 20 percent more output energy for a given amount of input energy than the prior art bimorph or monomorph.

The previously mentioned circular prior art bimorph has an upper cutoff frequency $w_h$ on the order of 5 MHz, whereat the vibration of excited material is damped out so that it cannot effectively oscillate the cone thereby limiting the high frequency response of the speaker. On the other hand, where the mass and stiffness of center vane is varied in accordance with this embodiment of the invention, the upper cutoff frequency response is extended to 7 KHz.

As shown in FIG. 6 and for reasons previously mentioned, wafers 74 and 76 are prestressed into a concave configuration. This tensile prestressing tends to overcome the undesirable mechanical hysteresis, which is inherent in the prior art bimorph, because the prestressing provides a restoring force which tends to overcome the natural resilience of the material and return the bimorph to its initial orientation as the driving signal goes through its zero crossings.

Although this embodiment of the invention has been described in relation to bimorphs it is apparent that the invention is equally applicable to monomorphs. For instance, either piezoelectric wafer 72 or wafer 74 could be replaced by a similarly shaped nonpiezoelectric wafer. Furthermore, the nonpiezoelectric wafer and the corrugated center vane 78 could be combined to form an integral structure, thus resulting in a monomorph having two elements.

What has been described, therefore, is an improved bender which has increased coefficient of electro-mechanical coupling, high frequency response, structural strength and linearity.

I claim:

1. A piezoelectric bender suitable for being attached and effectively operated between a movement restricting structure and a mechanical load, this operation creating bending forces of different magnitudes in predetermined incremental portions of the bender, such bender including in combination:

a first circular member formed from piezoelectric material with at least first and second diametrically opposed edge portions being mechanically coupled to one of the movement restricting structure and the mechanical load, and a third portion intermediate said edge portions and which is mechanically coupled to the other of the movement restricting structure and the mechanical load, said first circular member being comprised of a plurality of integral incremental circular portions each having a different stiffness, said stiffnesses becoming proportionally greater toward said edge portions than the magnitudes of the bending forces;

first signal conducting means affixed to said first member for applying electrical signals thereto or deriving electrical signals therefrom; and a second circular member having first and second surfaces, said first surface being mechanically coupled to said first member, said second member further having first and second edge portions and a third portion of said second member being intermediate said edge portions thereof, said first, second and third portions of said second member being connected to said first, second and third portions, respectively, of said first member, said second member having integral, incremental portions constructed to have incremental stiffnesses which are greatest at said third portion of said second member and which decrease to where said incremental stiffnesses are least at said edge portions of said second member, said incremental portions of said first and second circular members cooperating to cause the composite stiffness of each of the predetermined incremental portions of the piezoelectric bender to be proportional to the magnitude of the bending forces applied thereto.

2. The piezoelectric bender of claim 1 wherein said second member is comprised of homogeneous material having a thickness which is greatest at said third portion of said second member and which thickness continuously decreases to where it is least at said first and second edge portions of said second member.

3. The piezoelectric bender of claim 1 wherein said first circular member is substantially bowl shaped.

4. The piezoelectric bender of claim 1 wherein said third portion of said first circular member is located about the center of said first circular member.

5. The piezoelectric bender of claim 1 further including:

a third circular member formed from piezoelectric material;

second signal conducting means affixed to said third member for applying electrical signals thereto or deriving electrical signals therefrom;

said second member being comprised of conductive material, said second surface of said second member being mechanically and electrically coupled to said third circular member to provide an electrical interconnection between said first and third members; and said first and said third members being polarized to move in opposite radial directions in response to an electrical potential being applied across said second member and said first and second signal conducting means.

6. The piezoelectric bender of claim 5 wherein said third circular member is substantially bowl shaped.

7. A piezoelectric bender, including in combination:

at least a first bowl shaped element having an open end, said first element being comprised of piezoelectric material and having a pair of opposing faces;

first electrode means affixed to at least one of said opposing faces;

a resilient member having a center and first and second diametrically opposed edges and first and second sides with a plurality of raised portions having apices on at least said first side thereof, said apices having heights which are greatest at the center of said resilient member and which heights decrease from said center out toward the edge of said resilient member, said apices on the first side of said resilient member being affixed to said first bowl shaped element.

8. The piezoelectric bender of claim 7 wherein the open end of said first bowl shaped element is circular in shape, said resilient member is similar in shape to said shape of said open end and said raised portions on said resilient member are in the form of a three dimensional spiral having a gradually changing height.

9. The piezoelectric bender of claim 7 wherein said resilient member is circular in shape and said raised portions each lie within concentric circles of different radii which are centered about said center of said resilient member.

10. The piezoelectric bender of claim 7 further including:

a second bowl shaped element having an open end; and said resilient member having a plurality of raised portions having apices on said second side thereof having heights which are greatest at the center of said resilient member and which decrease from said center out toward the edges of said resilient member, said apices on the second side of said resilient member being affixed to said second bowl shaped element.

11. The piezoelectric bender of claim 10 wherein said second bowl shaped element is comprised of piezoelectric material and said resilient member is made from electrically conductive material thus providing electrical contact between said first and second piezoelectric elements.

12. A bimorph bender including in combination:

a pair of circular bowl shaped piezoelectric elements each having opposing inner faces with corresponding inner electrodes thereon;

a circular center vane positioned between the inner faces of said pair of piezoelectric elements and acting to space the same apart in fixed relationship, said center vane having a central part and a peripheral part with corrugations located on said central part having apex portions on alternate sides thereon, said apex portions being in electrical contact with said inner electrodes; and said corrugations further being in the form of a spiral having an amplitude which is greatest at the center of the central part and which amplitude continually decreases along the length of the spiral to where said amplitude is least at the edge of said central part.

13. The bimorph bender of claim 12 wherein said center vane is comprised of conductive material which makes electrical contact between said inner faces of said pair of bowl shaped piezoelectric elements.

14. The bimorph bender of claim 12 wherein said peripheral part of said center vane includes radial corrugations.

* * * * *